(12) United States Patent
Furukawa et al.

(10) Patent No.: US 9,333,552 B2
(45) Date of Patent: May 10, 2016

(54) METHOD FOR MANUFACTURING VEHICLE WHEEL, AND VEHICLE WHEEL

(75) Inventors: Masahide Furukawa, Aichi (JP); Fumito Inuzuka, Aichi (JP); Eiji Takashima, Aichi (JP)

(73) Assignee: CENTRAL MOTOR WHEEL CO., LTD., Aichi (JP)

( * ) Notice: Subject to any disclaimer, the term of this patent is extended or adjusted under 35 U.S.C. 154(b) by 325 days.

(21) Appl. No.: 13/990,029

(22) PCT Filed: Feb. 23, 2011

(86) PCT No.: PCT/JP2011/053961
§ 371 (c)(1),
(2), (4) Date: May 28, 2013

(87) PCT Pub. No.: WO2012/114470
PCT Pub. Date: Aug. 30, 2012

(65) Prior Publication Data
US 2013/0239411 A1    Sep. 19, 2013

(51) Int. Cl.
*B21D 53/30* (2006.01)
*B60B 21/02* (2006.01)
*B60B 21/10* (2006.01)

(52) U.S. Cl.
CPC .............. *B21D 53/30* (2013.01); *B60B 21/025* (2013.01); *B60B 21/104* (2013.01); *B60B 2900/113* (2013.01); *B60B 2900/5116* (2013.01); *Y10T 29/49524* (2015.01)

(58) Field of Classification Search
CPC ...... B21D 53/30; B21D 53/26; B21D 53/264; B60B 21/104; B60B 21/025; B60B 2900/113; B60B 2900/5116; B60B 1/06; B60B 1/08; B60B 3/02; B60B 3/06; Y10T 29/49524; B22D 15/005; B22D 15/00
See application file for complete search history.

(56) References Cited

U.S. PATENT DOCUMENTS

| 7,588,052 B2 * | 9/2009 | Reuter ............................ 138/89 |
| 2005/0212350 A1 * | 9/2005 | Yamamoto et al. ...... 301/63.101 |

FOREIGN PATENT DOCUMENTS

| JP | 2003-326904 A | 11/2003 |
| JP | 2010-269679 A | 12/2010 |
| JP | 2010-269694 A | 12/2010 |
| JP | 2010-269695 A | 12/2010 |

OTHER PUBLICATIONS

International Search Report issued in International Application No. PCT/JP2011/053961 mailed May 24, 2011.

* cited by examiner

*Primary Examiner* — David Bryant
*Assistant Examiner* — Jun Yoo
(74) *Attorney, Agent, or Firm* — McDermott Will & Emery LLP

(57) ABSTRACT

A recess is formed on the periphery of each of through-holes that go through a rim cavity, and the outer surface of a rim part is cut while a seal member for sealing the through-hole is positioned on the recess. It is thereby possible to stably manufacture a vehicle wheel in which swarf tends not to remain inside the rim cavity. Furthermore, it is not necessary to avoid the seal member for sealing the through-hole when cutting the outer surface of the rim part, and the outer surface of the rim part can be cut without any distinction having to be made between the periphery of the through-hole and the rest of the outer surface. Any increase in manufacturing costs can be minimized.

8 Claims, 8 Drawing Sheets

(A)

(B)

(C)

(D)

(E)

(F)

METHOD FOR MANUFACTURING VEHICLE WHEEL, AND VEHICLE WHEEL

RELATED APPLICATIONS

This application is the U.S. National Phase under 35 U.S.C. §371 of International Application No. PCT/JP2011/053961, filed on Feb. 23, 2011, the disclosure of which Application is incorporated by reference herein.

FIELD OF THE INVENTION

The present invention relates to a method for manufacturing a vehicle wheel including a rim part, and a vehicle wheel.

BACKGROUND

For vehicles such as automobiles, due to advancement in technology of engine noise reduction, a road noise that results from a vibration input from a road surface during traveling of a vehicle has become increasingly apparent. As one of the reasons for this road noise, cavity resonance has been raised, and it occurs in a space within a tire that is sealed by the tire and a rim part of a vehicle wheel. This cavity resonance is generated when a standing wave having one wavelength equal to a perimeter of the space within the tire is generated by the vibration input from the road surface during traveling of the vehicle and then this standing wave causes a columnar resonance phenomenon in a particular frequency band (e.g., 180 Hz to 240 Hz).

As a method for reducing the above cavity resonance, a configuration that applies a Helmholtz resonant absorber has been proposed. For example, a configuration has been proposed in which plural auxiliary air chambers in Japanese Patent Publication No. 2003-326904(JP-A-2003-326904) are circumferentially formed in the rim part of the vehicle wheel and in which a hole that communicates with the space within the tire is provided for each of the auxiliary air chambers. In this configuration, a Helmholtz resonant absorber is constituted by the auxiliary air chambers and the holes, and it is thereby possible to reduce the cavity resonance that occurs in the space within the tire. The patent document: JP-A-2003-326904 suggests a method for shaping the auxiliary air chamber and the hole that includes the steps of: forming a vertical wall part that projects from an outer surface of the rim part during casting; bending the vertical wall part to form the auxiliary air chamber; and drilling the hole in the bent vertical wall part.

SUMMARY OF THE INVENTION

Disclosure of the Invention

Problem of the Invention

When the auxiliary air chamber and the hole that constitute the Helmholtz resonant absorber are formed according to the method for shaping that is disclosed in above JP-A-2003-326904, the vertical wall part is bent to form the auxiliary air chamber before the hole is drilled. Accordingly, swarf enters the hole during the drilling and remains in the auxiliary air chamber. In addition, in a general process of manufacturing a vehicle wheel, the outer surface of the rim part is cut to make the outer surface in a desired shape and size. However, if such a cutting work is done after the drilling of the hole, the swarf enters through the hole and remains in the auxiliary air chamber. The thus remained swarf in the auxiliary air chamber closes the hole, which potentially reduces an effect of the resonant absorber and causes unexpected failure in following processes of manufacturing or after the tire is mounted. Therefore, a method for manufacturing by which the swarf tends not to remain in a cavity has been desired for a vehicle wheel that includes the cavity and a through-hole that goes through the cavity like the auxiliary air chamber and the hole that constitute the resonant absorber.

The present invention suggests a method for manufacturing a vehicle wheel by which swarf tends not to remain inside a rim cavity formed in a rim part, and a vehicle wheel.

Means for Solving the Problem

In a method for manufacturing a vehicle wheel that includes a rim part, a cavity forming process and a cutting process are performed in series. The cavity forming process is for forming a rim cavity as a cavity that is integrally formed inside the rim part, a through-hole that goes through the rim cavity and opens to an exterior of the wheel, and a recess that dents a periphery of the through-hole, and the cutting process is for cutting an outer surface of the rim part in a state while a seal member for sealing the through-hole is positioned on the recess.

According to such a method for manufacturing, the recess is formed on the periphery of the through-hole that goes through the rim cavity, and the outer surface of the rim part is cut while the seal member for sealing the through-hole is positioned on the recess. Accordingly, it is possible to inhibit swarf that is produced during cutting from entering the rim cavity from the through-hole, and thus to stably manufacture a vehicle wheel in which the swarf tends not to remain inside the rim cavity. In addition, because the recess is formed on the periphery of the through-hole, there is no necessity to avoid the seal member for sealing the through-hole when cutting the outer surface of the rim part, and the outer surface of the rim part can be cut without any distinction having to be made between the periphery of the through-hole and the rest of the outer surface. Therefore, any increase in manufacturing costs can be minimized.

The method for manufacturing a vehicle wheel according to the present invention is suggested in which the through-hole opens to a side of the rim part on which a tire is mounted. According to such a method for manufacturing, a vehicle wheel that includes a Helmholtz resonant absorber constituted by the rim cavity and the through-hole can be manufactured. Then, according to the method for manufacturing of the present invention, even with a configuration that the Helmholtz resonant absorber is integrally formed with the rim part, the vehicle wheel in which the swarf tends not to remain can be manufactured. Furthermore, it is possible to inhibit reduction of an effect to reduce cavity resonance that is caused when the swarf seals the through-hole.

In the method for manufacturing a vehicle wheel according to the present invention, it is suggested in the cavity forming process to sequentially perform: a process for forming a plate-like vertical wall part that projects radially outward from the outer surface of the rim part in an integral manner with the rim part; a process for forming the through-hole that goes through the vertical wall part in a thickness direction thereof and forming the recess that dents the periphery of the through-hole on a side wall surface of the vertical wall part; and a process for bending the vertical wall part so that the recess is positioned in an outer surface side of the wheel and for abutting a tip of the vertical wall part against the outer surface of the rim part to form the rim cavity in the rim part.

According to such a method for manufacturing, the through-hole and the recess are formed in the vertical wall part that is integrally formed with the rim part, and then the vertical wall part is bent to form the rim cavity. Accordingly, the swarf that is produced by drilling the through-hole can easily be removed. Therefore, it is possible to inhibit the swarf from remaining in the rim cavity. Furthermore, as described above, because the swarf that is produced by cutting the outer surface of the rim part is inhibited from entering the rim cavity, it is possible to stably manufacture the vehicle wheel that includes the rim cavity in which the swarf is inhibited from remaining.

The rim cavity is formed by bending after the through-hole and the recess are formed. Accordingly, there is an advantage that length of the through-hole can easily be controlled. This is because the length of the through-hole is determined before the outer surface of the rim part is cut and before the bending by which the rim cavity is formed. In addition, the length of the through-hole affects frequency characteristics of the cavity resonance that exhibits a reduction effect when the through-hole constitutes the Helmholtz resonant absorber. Therefore, compared to a conventional method for manufacturing by which the recess is not formed, variation in the frequency characteristics can be reduced.

In this case, the vehicle wheel is preferably a so-called cast wheel that is formed by casting. It is because a casting process for integrally forming the vertical wall part with the rim part can be performed in a method for manufacturing a cast wheel. Also, the cast wheel made of an aluminum alloy is preferred.

The method for manufacturing a vehicle wheel according to the present invention is suggested in which the rim part includes a bead seat for supporting a bead of the tire and in which the rim cavity is formed in an inner diameter side of the bead seat in the cavity forming process.

According to such a method for manufacturing, it is possible to inhibit degradation of a tire assembling property by providing the rim cavity in the rim part. In the method for manufacturing as described above, it is preferred that the vehicle wheel be manufactured by the casting and to adopt a configuration in which a disk part that includes a joint part joined to a vehicle is connected in the vicinity of the bead seat in the rim part and in which the rim cavity is formed in the rim part to which the disk part is connected. It is because, in a case of the cast wheel, a portion of the rim part to which the disk part is connected is relatively thick, but the weight of the vehicle wheel can be reduced by forming the rim cavity in the rim part.

The method for manufacturing a vehicle wheel according to the present invention is suggested in which the recess is formed in the cavity forming process such that depth of the recess in the thickness direction is deeper than thickness of the seal member.

According to such a method for manufacturing, it is possible to inhibit the seal member from being damaged or coming off during the cutting when the outer surface of the rim part is cut after the seal member is positioned on the recess. Therefore, it is possible to stably manufacture the vehicle wheel that includes the rim cavity in which the swarf tends not to remain.

The method for manufacturing a vehicle wheel according to the present invention is suggested in which the outer surface of the rim part that includes the periphery of the recess is cut in the circumferential direction of the wheel in the cutting process.

According to such a method for manufacturing, there is no necessity to perform a special cutting process for the periphery of the through hole. Therefore, the periphery of the through-hole can also be manufactured by applying the same cutting method as a general cutting method for a vehicle wheel.

In a vehicle wheel that includes the rim part according to the present invention, the rim part includes: the rim cavity as the cavity that is integrally formed with the rim part; the through-hole that goes through the rim cavity and opens to the exterior of the wheel; and the recess that dents the periphery of the through-hole, and is formed by cutting the outer surface of the rim part after the recess is formed.

According to such a vehicle wheel, similar to the method for manufacturing a vehicle wheel according to the present invention, which is described above, the vehicle wheel can be adapted such that the swarf tends not to remain inside the rim cavity. In addition, because the recess is formed on the periphery of the through-hole, there is no necessity to avoid the seal member for sealing the through-hole when cutting the outer surface of the rim part, and thus the outer surface of the rim part can be cut without any distinction having to be made between the periphery of the through-hole and the rest of the outer surface. Therefore, any increase in manufacturing costs can be minimized.

In the vehicle wheel according to the present invention, a configuration is suggested in which the through-hole open to the side of the rim part on which the tire is mounted.

According to such a configuration, the vehicle wheel includes the Helmholtz resonant absorber constituted by the rim cavity and the through-hole. Then, according to the vehicle wheel of the present invention, even when the vehicle wheel includes the Helmholtz resonant absorber that is integrally formed with the rim part, the swarf tends not to remain. Furthermore, it is possible to inhibit the swarf from sealing the through-hole and to maintain the effect to reduce the cavity resonance.

In the vehicle wheel according to the present invention, a configuration is suggested in which the rim part include the bead seat for supporting the bead of the tire, and in which the rim cavity be formed in the inner diameter side of the bead seat.

According to such a configuration, it is possible to inhibit degradation of the tire assembling property by providing the rim cavity in the rim part. In such a vehicle wheel, it is preferable that the vehicle wheel be manufactured by the casting and to adopt a configuration in which the disk part that includes the joint part joined to the vehicle is connected in the vicinity of the bead seat in the rim part and in which the rim cavity is formed in the rim part to which the disk part is connected. It is because, in the case of the cast wheel, the portion of the rim part to which the disk part is connected is relatively thick in the vehicle wheel, but the weight of the vehicle wheel can be reduced by forming the rim cavity in the rim part.

In the vehicle wheel according to the present invention, a configuration is suggested in which the outer surface of the rim part that includes the periphery of the recess be cut along the circumferential direction of the wheel.

According to such a configuration, there is no necessity to perform a special cutting process for the periphery of the through hole. Therefore, in the vehicle wheel, the same cutting method as the general cutting method for a vehicle wheel can be adopted for the periphery of the through-hole.

Effect of the Invention

According to a method for manufacturing a vehicle wheel of the present invention, a recess is formed on a periphery of a through-hole that goes through a rim cavity, and an outer surface of a rim part is cut while a seal member for sealing the through-hole is positioned on the recess. Accordingly, it is possible to inhibit swarf that is produced during cutting from entering the rim cavity from the through-hole and thus to stably manufacture a vehicle wheel in which the swarf tends not to remain inside the rim cavity. Furthermore, because the recess is formed on the periphery of the through-hole, there is no necessity to avoid the seal member for sealing the through-hole when cutting the outer surface of the rim part, and the outer surface of the rim part can be cut without any distinction having to be made between the periphery of the through-hole and the rest of the outer surface. Therefore, any increase in manufacturing costs can be minimized.

In the vehicle wheel according to the present invention, similar to the method for manufacturing a vehicle wheel of the present invention described above, the swarf tends not to remain inside the rim cavity. Furthermore, because the recess is formed on the periphery of the through-hole, there is no necessity to avoid the seal member for sealing the through-hole when cutting the outer surface of the rim part, and the outer surface of the rim part can be cut without any distinction having to be made between the periphery of the through-hole and the rest of the outer surface. Therefore, any increase in manufacturing costs can be minimized.

DETAILED DESCRIPTION

An embodiment of the present invention will be described in detail with reference to the drawings.

Figure 1:
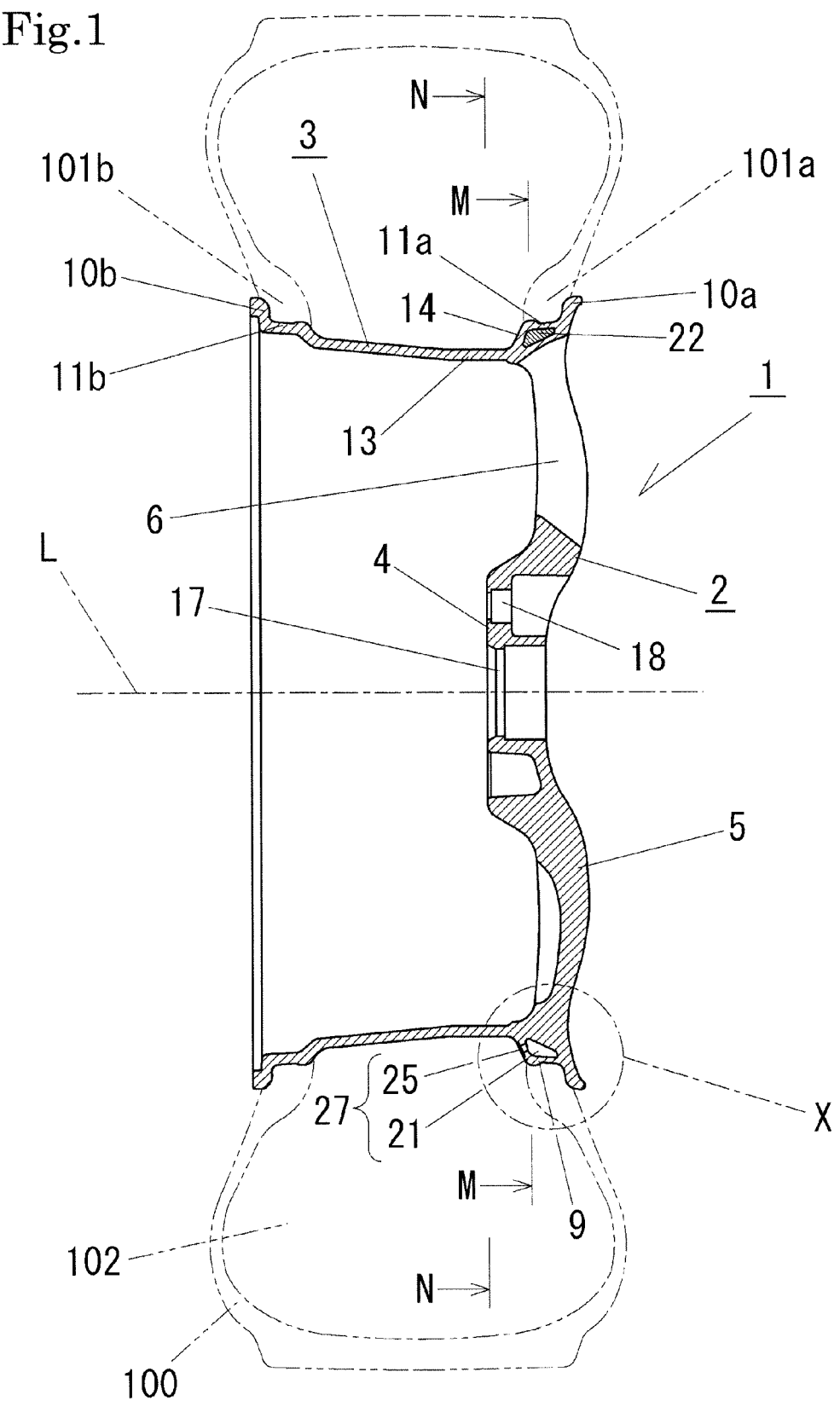
FIG. 1 is a vertical cross-sectional view of a vehicle wheel 1 in an embodiment according to the present invention.

FIG. 1 shows a vehicle wheel 1 according to the present invention. This vehicle wheel 1 is formed by casting an aluminum alloy, and includes a disk part 2 to which an axle is connected and a rim part 3. In this embodiment, a direction from a back surface side of the disk part 2 toward a design surface side is defined to as a "forward direction", and the opposite direction is defined to as a "backward direction". Also, a direction toward a center axis L of the vehicle wheel 1 along a radial direction of the wheel that is perpendicular to the center axis L is defined to as "inward", and the opposite direction is defined to as "outward".

Figure 2:
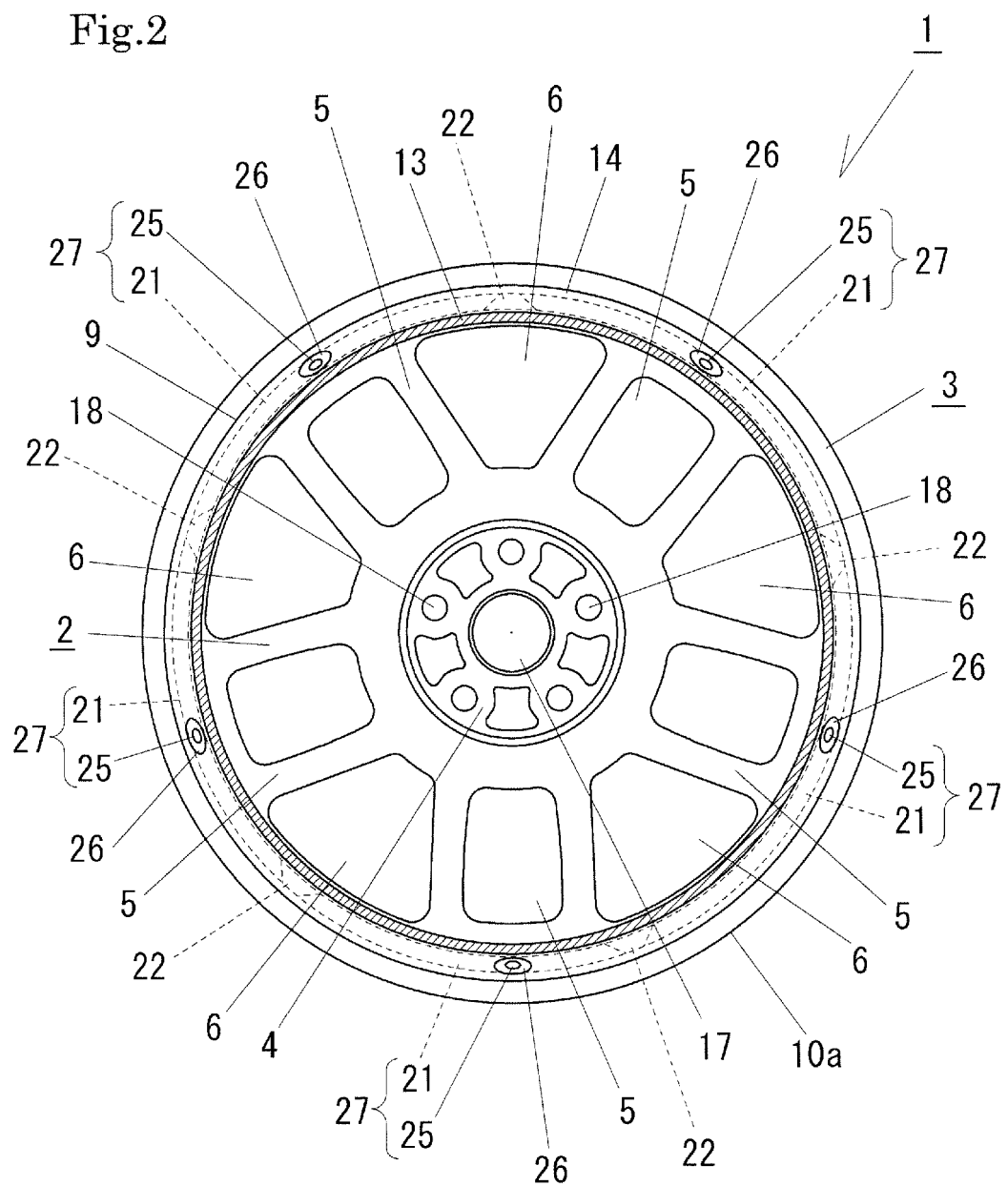
FIG. 2 is a horizontal cross-sectional view of the vehicle wheel 1 that is cut along the line N-N of FIG. 1.
Figure 3:
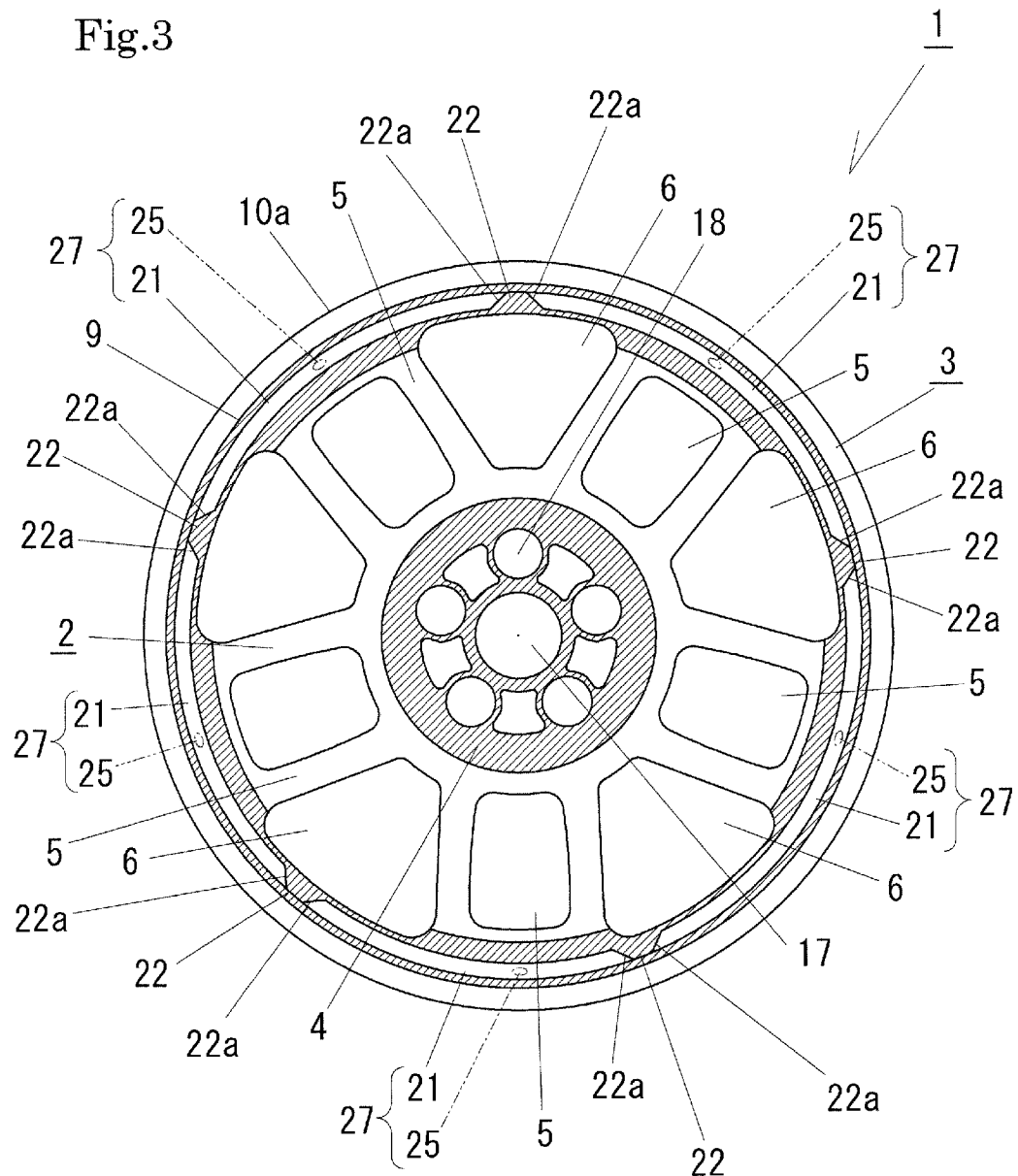
FIG. 3 is a horizontal cross-sectional view of the vehicle wheel 1 that is cut along the line M-M of FIG. 1.
Figure 4:
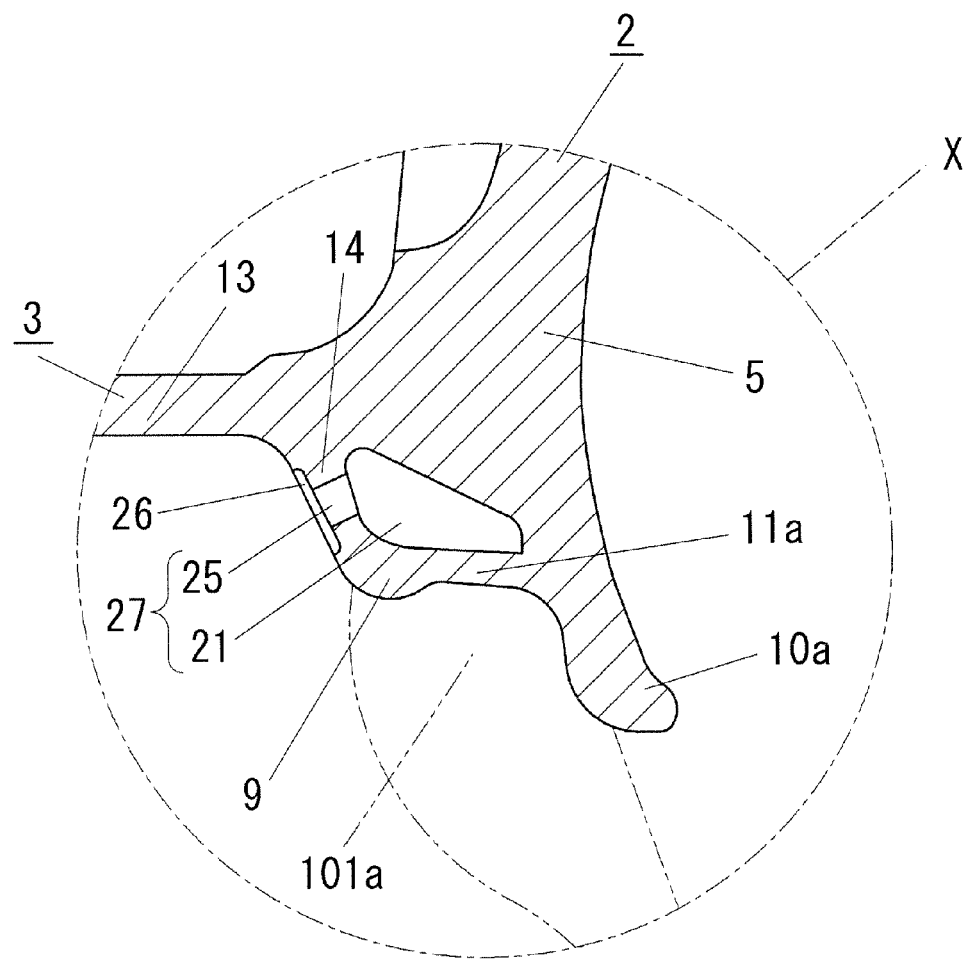
FIG. 4 is an enlarged view of a section X in FIG. 1.

The disk part 2 includes a generally disk-shaped hub attachment part 4, and plural spoke parts 5 that are provided radially outward from an outer peripheral edge of the hub attachment part 4 (see FIGS. 2 and 3). The hub attachment part 4 is provided at the center thereof with a hub hole 17, and plural bolt holes 18 that are arranged on the outer side of the hub hole 17 at equally spaced intervals in a circumferential direction. Also, ornamental holes 6 are respectively formed between adjacent ones of the spoke parts 5 (see FIGS. 2 and 3).

In addition, flange parts 10a, 10b that respectively hold beads 101a, 101b of a tire 100 from a side are formed at opening edges on both front and back ends of the rim part 3. Front-side and back-side beat seats 11a, 11b on which the beads of the tire are positioned for support and fixation are continuously formed with the flange parts 10a, 10b, respectively. Furthermore, a well part 13 is provided between the front-side and back-side bead seats 11a, 11b for dropping the beads of the tire during mounting of the tire. The front-side bead seat 11a and the well part 13 are continuously formed through a well wall part 14. The front-side bead seat 11a and the well wall part 14 are provided on an annular outer rim part 9 that is continuously formed with each of the spoke parts 5 in the disk part 2.

In this vehicle wheel 1, a so-called design surface is created by a front surface of the disk part 2 that serves an appearance of the wheel when the wheel is mounted in a vehicle. Each of the above-mentioned components of the vehicle wheel 1 is formed concentrically with the center axis L being the center thereof. When the specified tire 100 is mounted on the vehicle wheel 1, an annular space within the tire 102 that is closed by the rim part 3 and the tire 100 is defined.

As shown in FIGS. 1 to 4, five rim cavities 21 are circumferentially spaced and aligned on an inner side of the outer rim part 9 of the rim part 3. The adjacent ones of the rim cavities 21 are separated by one of five partition wall parts 22, and thus each of the rim cavities 21 has a space independent from each other. One through-hole 25 is formed for each of the rim cavities 21 in the well wall part 14 that constitutes the outer rim part 9. Each of the rim cavities 21 communicates with the exterior of the wheel (the space within the tire 102) only through the through-hole 25. Furthermore, a recess 26 that dents a periphery of each of the through-holes 25 is formed in the well wall part 14. This recess 26 is circular shaped and formed concentrically with the through-hole 25.

Each of five Helmholtz resonant absorbers 27 is constituted by each of the rim cavities 21 and each of the through-holes 25. Each of the rim cavities 21 and each of the through-holes 25 are shaped and sized such that each of the resonant absorbers 27 can exert an effect to reduce cavity resonance (a type of road noise) that occurs in the space within the tire 102 during traveling of the vehicle. More specifically, the Helmholtz resonant absorber 27 determines a frequency of a sound wave that can be dampened according to a volume of the rim cavity 21 as well as an opening diameter, length, and the like of the through-hole 25. Accordingly, the volume of the rim cavity 21 as well as the opening diameter and the length of the through-hole 25 is set so as to dampen the sound wave in a specified frequency band (e.g., 180 Hz to 270 Hz) that causes a columnar resonance phenomenon in the space within the tire 102. In this embodiment, the partition wall parts 22 are disposed at specifically spaced intervals in the circumferential direction of the wheel so that the five rim cavities 21 have different volumes from each other. The opening diameters and the lengths of the through-holes 25 are set to be the same with each other. Each of the thus set resonant absorbers 27 can dampen the sound waves with frequencies within the specified frequency band. According to the vehicle wheel of this embodiment, it is possible to efficiently reduce the cavity resonance that results from a vibration input into the tire 100 from a road surface during traveling of the vehicle.

Figure 5:
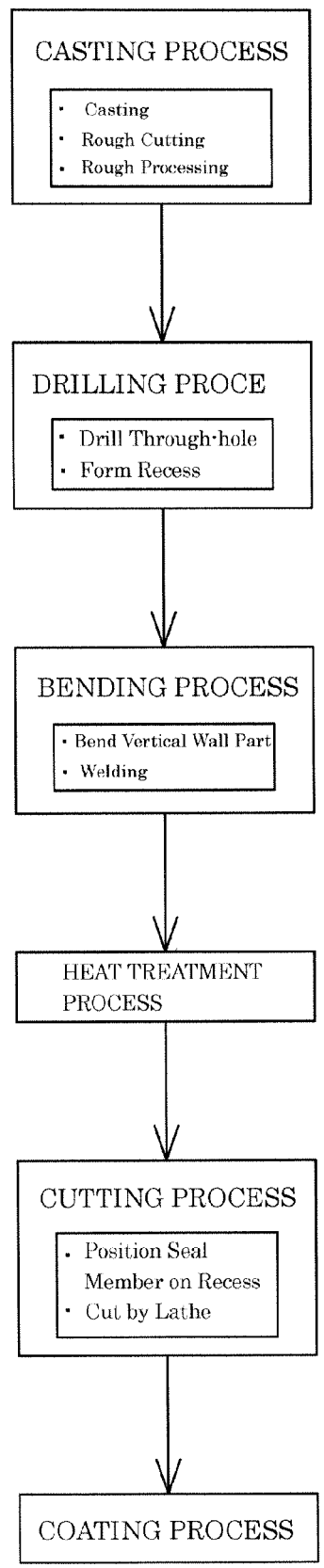
FIG. 5 is a flow chart that shows a process of manufacturing the vehicle wheel 1 in the embodiment according to the present invention.

Next, a description will be made on a method for manufacturing the above-mentioned vehicle wheel 1 of this embodiment. As shown in FIG. 5, in the method for manufacturing of this embodiment, processes of casting, drilling, bending, heat treatment, cutting, and coating are performed in series to manufacture the vehicle wheel 1. Each of the processes will hereinafter be described in detail.

In the casting process, a cavity of a casting die for forming the vehicle wheel 1 is filled with molten metal of the aluminum alloy that is heated and kept at a specified temperature, and a generally wheel-shaped cast body 51 (see FIG. 6A) is removed after being cooled. Furthermore, in this casting process, a surface of the cast body 51 removed from the casting die is roughly cut, and surpluses thereof such as a sprue are roughly machined for removal.

Figure 6:
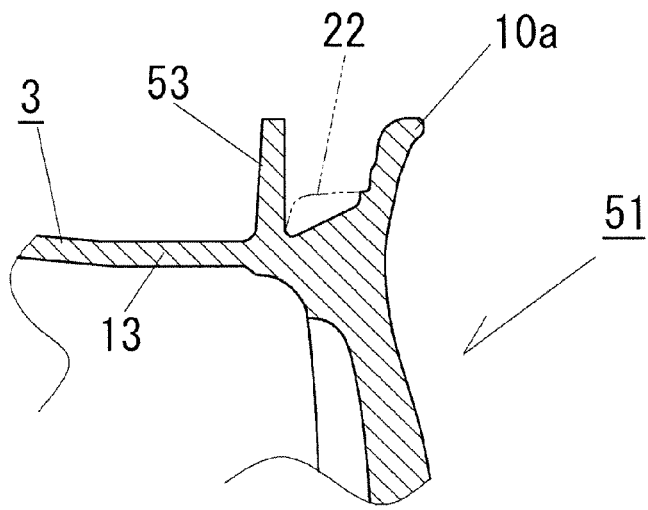
FIG. 6 is an explanatory view for showing a process for forming a rim cavity 21.
Figure 6:
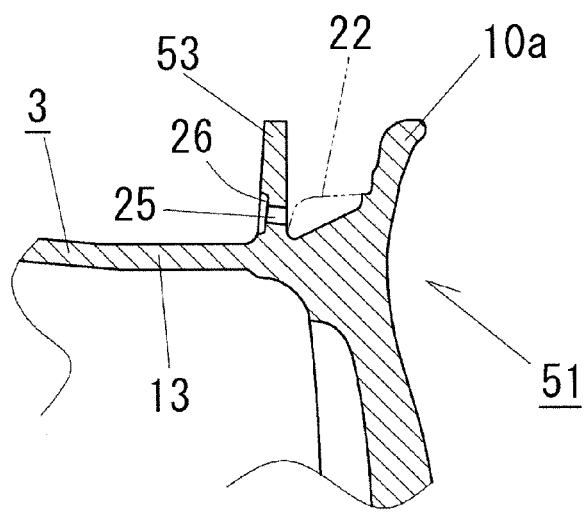
Figure 6:
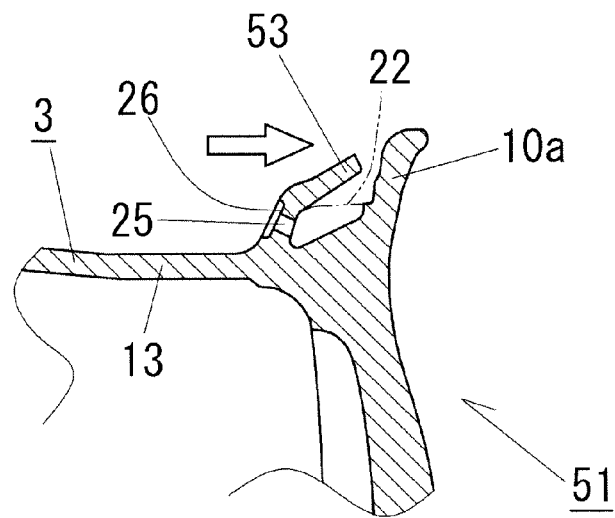
Figure 7:
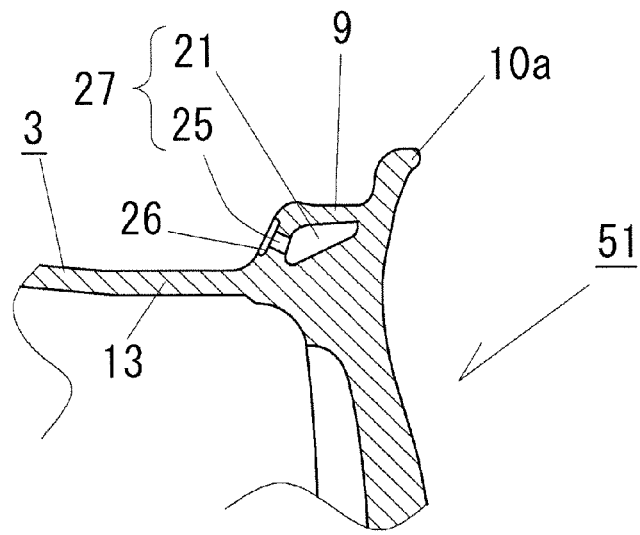
FIG. 7 is an explanatory view for showing a process for forming a rim cavity 21 that is continued from FIG. 6.
Figure 7:
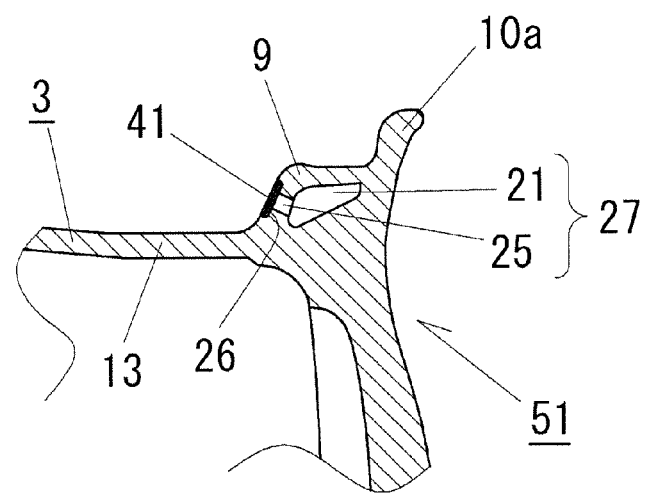
Figure 7:
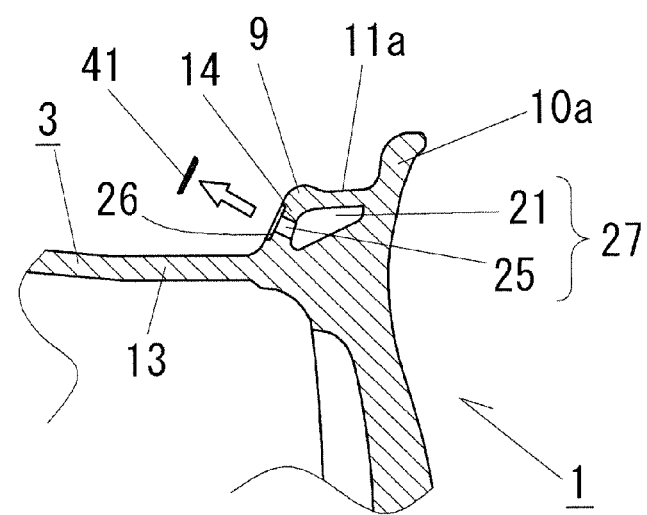

This cast body 51 is excessively thickened compared to the vehicle wheel 1 and shaped to be the vehicle wheel 1 in the desired size and shape by cutting the surface thereof in the cutting process, which will be described later. In FIGS. 6 and 7, the excessive thickness is not shown, and portions where each of the components of the vehicle wheel 1 is formed are denoted with the same names and the reference numerals for description. As shown in FIG. 6A, the cast body 51 is formed with the front-side flange part 10a, the well part 13, the back-side bead seat 11b, and the back-side flange part 10b on the rim part 3. On a portion of the well part 13 on a side of the front-side flange part 10a, a vertical wall part 53 that is in an annular disk shape and projects radially outward from the outer surface of the well part 13 is integrally and circumferentially formed. The front-side bead seat 11a is not formed on this cast body 51.

Because the vertical wall part 53 is bent by the bending process, which will be described later, to form the front-side bead seat 11a, positions in the forward direction and the backward direction as well as width in the radial direction is set such that the front-side bead seat 11a can be formed in the desired shape and size.

Furthermore, the five partition wall parts 22 are formed between the vertical wall part 53 and the front-side flange part 10a at specified intervals in the circumferential direction of the wheel (see FIG. 3). The partition wall parts 22 are formed to stand radially outward along the forward and backward directions. Then, the partition wall parts 22 are set to have a specified height in the radial direction of the wheel so that the vertical wall part 53 that is bent in the bending process as described later can form the front-side bead seat 11a (see FIG. 6C). As shown in FIG. 3, the partition wall part 22 has a generally trapezoidal cross section and includes inclination sides 22a, 22a on both sides. In this embodiment, the casting die in use includes a horizontal die that is divided into four parts and removed outward in the radial direction of the wheel, and an angle between the inclination sides 22a, 22a is set to be approximately 90 degrees. A reason for such settings is that a draft that is required for removal of the partition wall part 22 from the horizontal die can be secured at any position.

In this casting process, a surface from the vertical wall part 53 to the front-side flange part 10a (including the surface of the partition wall part 22) is cut by the rough processing as described above. Accordingly, a cross section of each of the rim cavities 21 that is formed by bending the vertical wall part 53 is shaped.

In such a casting process, the casting die in use is designed such that the cast body 51 can be shaped. A conventional casting method such as high-pressure casting, low-pressure casting, or gravity casting can be applied for this casting process, and thus this casting process is not described in detail.

The drilling process is performed after such a casting process. In the drilling process, as shown in FIG. 6B, the five through-holes 25 are drilled in the vertical wall part 53, and the recess 26 is formed on the periphery of each of the through-holes 25. The through-hole 25 is formed in a radially inward position of the vertical wall part 53 such that it penetrates the vertical wall part 53 in a thickness direction. Then, each of the through-holes 25 is provided between adjacent ones of the partition wall parts 22 (see FIGS. 2 and 3). Furthermore, on a back-side wall surface of the vertical wall part 53, the recess 26 is formed that dents the periphery of each of the through-holes 25 in a circular shape. This recess 26 is formed concentrically with the through-hole 25. In addition, depth of this recess 26 in the thickness direction is set in consideration of thickness of a seal member 41, which will be described later, and a cutting allowance on the outer surface of the rim part 3 that is cut in the cutting process, which will be described later, so as to prevent the seal member 41 from coming off. In this embodiment, the depth of the recess 26 in the thickness direction is set to be larger than a sum of the thickness of the seal member 41 and the cutting allowance. This recess 26 can be formed such as by cutting or by pressing. The swarf produced by the drilling is removed after the through-hole 25 and the recess 26 are formed.

The bending process is performed after such a drilling process. In the bending process, as shown in FIG. 6C and FIG. 7D, the vertical wall part 53 is bent, and then the vertical wall part 53 and the front-side flange part 10a are welded together. In this process, the vertical wall part 53 is bent in the forward direction by spinning, and a tip of the vertical wall part 53 is abutted against the front-side flange part 10a along the circumferential direction of the wheel. Then, by following the partition wall parts 22, the vertical wall part 53 is bent to be abutted against the partition wall parts 22. The vertical wall part 53 is bent at a portion that is approximately in the middle thereof in the radial direction and has approximately the same height as the partition wall parts 22. After the spinning, the tip of the vertical wall part 53 is welded to the front-side flange part 10a for an entire circumference of the wheel. It is thereby possible to form the outer rim part 9 that includes therein the five rim cavities 21 defined by the partition wall parts 22. The rim cavity 21 includes one of the through-holes 25 and communicates with the exterior of the wheel through each of the through-holes 25. Because the recess 26 of each of the through-holes 25 is formed in the back-side wall surface of the vertical wall part 53, it is exposed to the outer surface of the outer rim part 9. Because the through-hole 25 and the recess 26 are formed in the radially inward position of the vertical wall part 53 as described above, they are positioned in the well wall part 14.

In such a bending process, due to the presence of each of the through-holes 25, air that is thermally expanded by heat generated during welding is discharged from each of the through-holes 25 and thus is inhibited from remaining in each of the rim cavities 21. Therefore, it is possible to reduce occurrence of failure such as a deformation that can be caused by the thermally expanded air in the rim cavities 21.

In the method for manufacturing of this embodiment, the through-holes 25 and the recesses 26 are formed in the vertical wall part 53 in the drilling process, and then the rim cavities 21 are formed in the bending process. Therefore, it is possible to securely prevent the swarf that is produced in the drilling process from remaining in the rim cavities 21.

The heat treatment process is performed after such a bending process. In the heat treatment process, a T6 treatment is conducted in which a solution is heat-treated at a specified treatment temperature and kept at a specified temperature for artificial aging after a solution treatment. It is thereby possible to increase strength by homogenization of an internal structure and precipitation hardening.

Figure 8:
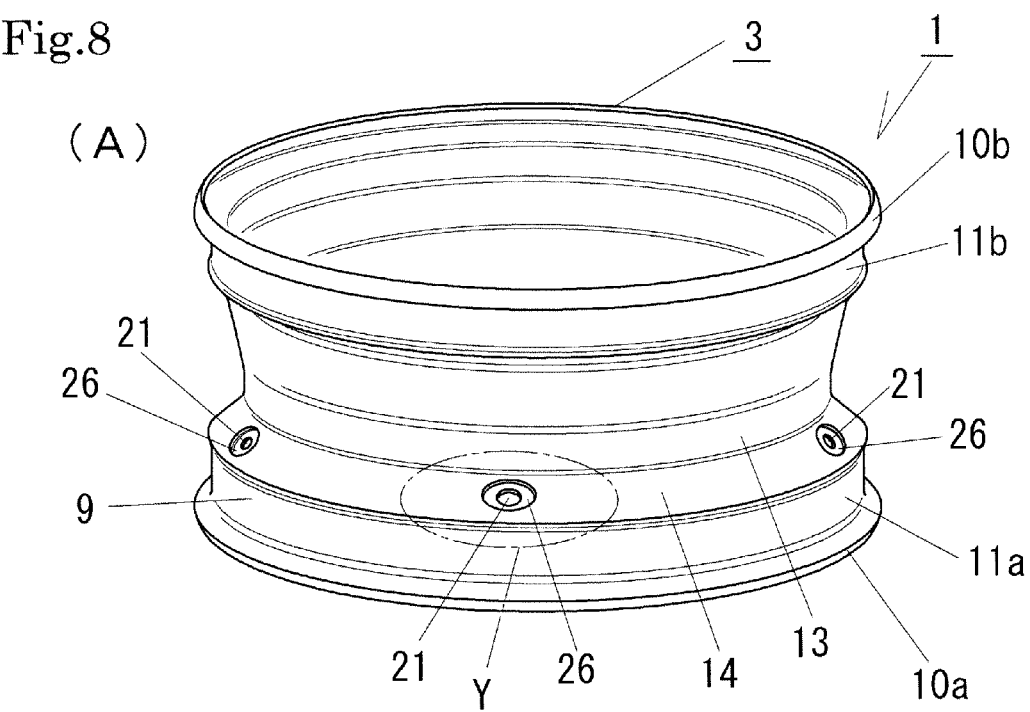
FIG. 8A is a perspective view of a rim part 3.
FIG. 8B is an enlarged view of a section Y.
Figure 8:
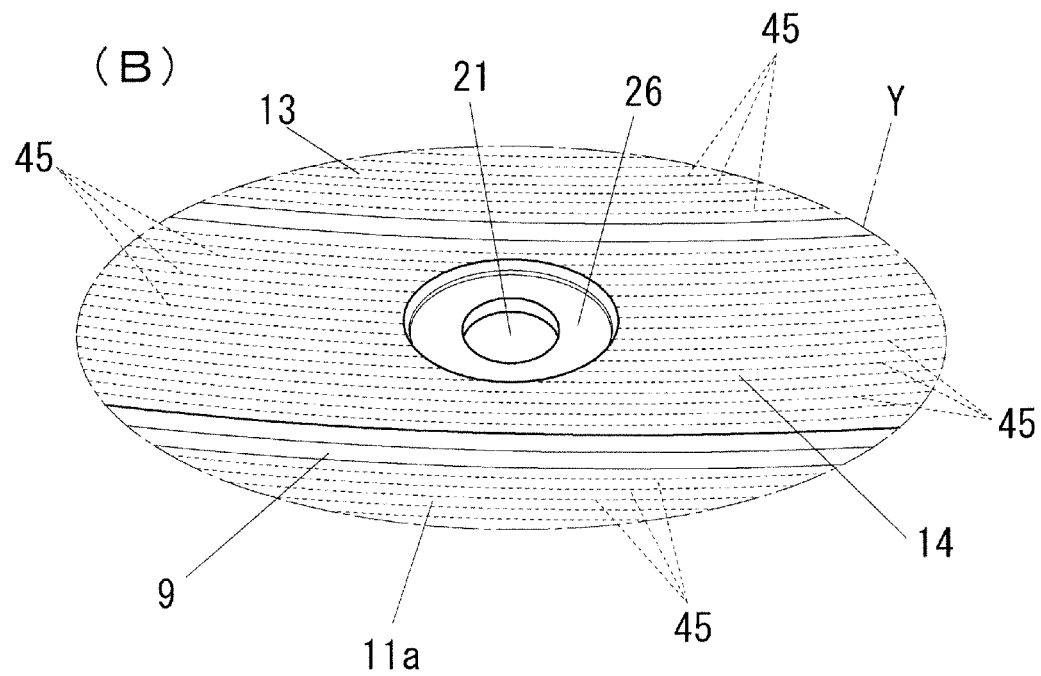

The cutting process is performed after such a heat treatment process. In the cutting process, as shown in FIGS. 7E and 7F, the seal member 41 that blocks each of the through-holes 25 is first positioned on the recess 26. Then, the cast body 51 is rotated about the center axis L thereof by a lathe, which is not shown, to cut the outer surface of the rim part 3 that includes the front-side bead seat 10a and the well wall part 14. Similar to a vehicle wheel that does not include the rim cavity or the through-hole, the outer surface of the rim part 3 is cut by a general cutting method. FIG. 8 shows the vehicle wheel 1 and the outer surface on the periphery of the recess 26 after the cutting. As shown in the drawing, in the cutting, the outer surface of the rim part 3 on the periphery of the recess 26 and the outer surface of the rest of rim part 3 are cut for the entire circumference without any distinction having to be made therebetween. Thus, the vehicle wheel 1 of this embodiment has uniform cutting marks 45 in the circumferential direction.

As described above, because the cutting process is performed while the seal member 41 for sealing each of the through-holes 25 is positioned on the recess 26, it is possible to inhibit the swarf that is produced during the cutting from entering the rim cavity 21 from the through-hole 25. In addition, because the recess 26 is provided on the periphery of the through-hole 25 in the vehicle wheel 1 of this embodiment, there is no necessity to avoid the seal member 41 for sealing each of the through-holes 25 when cutting the outer surface of the rim part 3. Therefore, any increase in manufacturing costs can be minimized. In this embodiment, the depth of the recess 26 in the thickness direction is set to be larger than the sum of the thickness of the seal member 41 and the cutting allowance in consideration of the thickness of the seal member 41 and the cutting allowance. It is because the seal member 41 can be prevented from being damaged or coming off during the cutting in this way.

In this cutting process, in addition to the cutting of the surface of the disk part 2, the swarf that is produced by the drilling such as of a bolt hole or a valve hole is rinsed for removal. Then, as shown in FIG. 7F, the seal member 41 is removed, and a leak test is performed for each of the rim cavities 21. A general leak test method can be used for this leak test, and thus the detailed description thereof will not be made.

The coating process is performed after such a cutting process. The coating process is performed while the seal member 41 is positioned on the recess 26 to seal the through-hole 25. Then, the seal member 41 is removed. In this embodiment, because the coating process is performed by adopting a known coating method, the detailed description thereof will not be made. As described above, similar to the cutting process, it is possible in the coating process to inhibit a coating or the like from entering the rim cavities 21.

According to the method for manufacturing the vehicle wheel 1 of this embodiment, which has been described so far, the recess 26 is formed on the periphery of the through-hole 25 that goes through the rim cavity 21, and the outer surface of the rim part 3 is cut while the seal member 41 for sealing each of the through-holes 25 is positioned on the recess 26. It is thereby possible to inhibit the swarf that is produced during the cutting from entering the rim cavity 21 from the through-hole 25, and thus to stably manufacture the vehicle wheel 1 in which the swarf tends not to remain inside the rim cavity 21. Furthermore, because the recess 26 is formed on the periphery of the through-hole 25, there is no necessity to avoid the seal member 41 for sealing the through-hole 25 when cutting the outer surface of the rim part 3, and the outer surface of the rim part 3 can be cut without any distinction having to be made between the periphery of the through-hole 25 and the rest of the outer surface. Therefore, any increase in manufacturing costs can be minimized.

According to the method for manufacturing the vehicle wheel 1 of this embodiment, because the swarf tends not to remain inside the rim cavities 21, it is possible to inhibit reduction in the effect to reduce the cavity resonance, which is caused when the swarf seals the through-hole 25. Furthermore, the outer rim part 9 is formed by bending of the vertical wall part 53 after the through-hole 25 and the recess 26 are formed in the vertical wall part 53. Therefore, it is possible to inhibit variation in length of the through-holes 25 that affects frequency characteristics of the resonant absorber 27.

In this embodiment, a process for forming a cavity according to the present invention includes the casting process, the drilling process, and the bending process.

In this embodiment, the through-hole 25 opens to the space within the tire 102. However, any configuration can be adopted as long as the through-hole 25 opens to the exterior of the vehicle wheel 1. For example, the through-hole 25 may open inward in the rim part 3.

In this embodiment, the rim cavity 21, the through-hole 25, and the recess 26 are formed in the outer rim part 9. However, any configuration can be adopted as long as the rim cavity is integrally formed in the rim part. For example, the rim cavity may be formed in an inner rim part that forms the back-side bead seat, or the rim cavity may be formed in the well part.

In this embodiment, the recess is formed in the circular shape. However, any shape can be adopted as long as the recess opens to the exterior of the vehicle wheel 1. For example, the recess may have an ellipsoidal shape or a polygonal shape. As for the seal member, the one attached in the cutting process and the one attached before the coating process may be the same or different. Particularly, the seal member that is attached before the coating process preferably exhibits superior heat resistance.

The present invention is not limited to the above-mentioned embodiment. Various modifications can be made for the embodiment, and configurations other than that in the embodiment can appropriately be practiced within the scope of the present invention.

DESCRIPTION OF REFERENCE NUMERALS

1: vehicle wheel
3: rim part
9: outer rim part
11a: front-side bead seat
11b: back-side bead seat
13: well part
21: rim cavity
25: through-hole
26: recess
41: seal member
45: cutting mark

The invention claimed is:

1. A method for manufacturing a vehicle wheel that includes a rim part, the method sequentially performing:
a cavity forming process for forming a rim cavity as a cavity that is integrally formed inside the rim part, a through-hole that goes through the rim cavity and opens to an exterior of a wheel, and a recess that dents a periphery of the through-hole;
a cutting process for cutting an outer surface of the rim part in a state that a seal member for sealing the through-hole is positioned in the recess, and a removing process for removing the seal member from the recess after the cutting process.

2. The method for manufacturing a vehicle wheel according to claim 1, wherein the through-hole opens to a side of the rim part on which a tire is mounted.

3. The method for manufacturing a vehicle wheel according to claim 1, wherein
the cavity forming process sequentially performs:
a process for forming a plate-like vertical wall part that projects radially outward from the outer surface of the rim part in an integral manner with the rim part;
a process for forming the through-hole that goes through the vertical wall part in a thickness direction and forming the recess that dents the periphery of the through-hole on a side wall surface of the vertical wall part; and
a process for bending the vertical wall part so that the recess is positioned in an outer surface side of the wheel and for abutting a tip of the vertical wall part against the outer surface of the rim part to form the rim cavity in the rim part.

4. The method for manufacturing a vehicle wheel according to claim 1, wherein
the rim part includes a bead seat for supporting a bead of the tire, and
the rim cavity is formed in an inner diameter side of the bead seat in the cavity forming process.

5. The method for manufacturing a vehicle wheel according to claim 1, wherein the recess is formed in the cavity forming process such that depth of the recess in the thickness direction is deeper than thickness of the seal member.

6. The method for manufacturing a vehicle wheel according to claim 1, wherein the outer surface of the rim part that includes the periphery of the recess is cut in a circumferential direction of the wheel in the cutting process.

7. The method for manufacturing a vehicle wheel according to claim 1, wherein the seal member is positioned only in the recess.

8. The method for manufacturing a vehicle wheel according to claim 1, wherein the recess is provided along an opening of the through-hole to support the seal member for sealing the through hole.

* * * * *